No. 629,465. Patented July 25, 1899.
W. P. PHILLIPS.
LUBRICATOR.
(Application filed June 27, 1898.)
(No Model.)
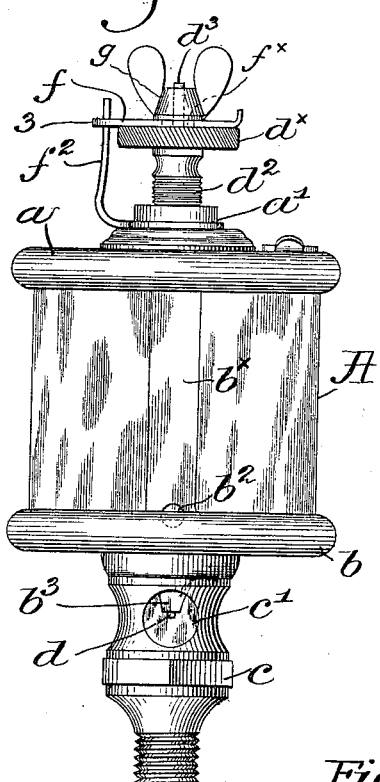
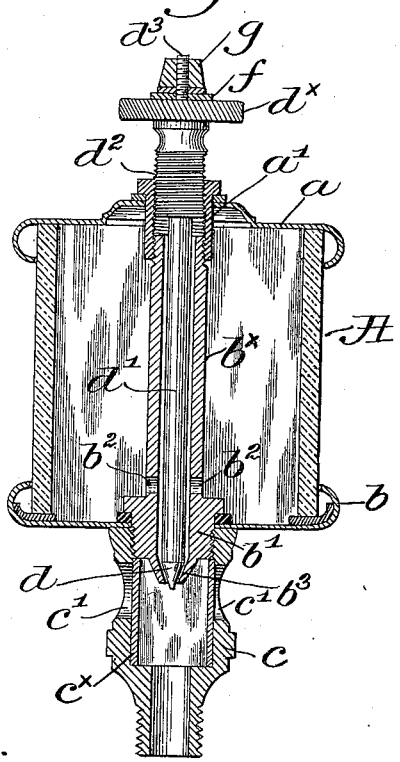
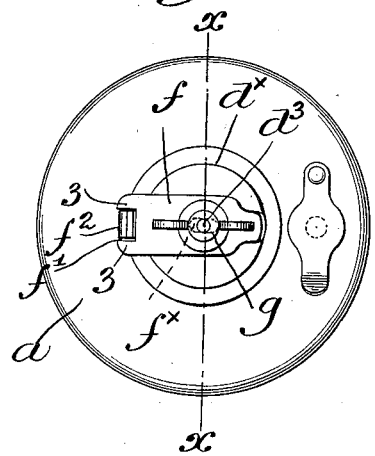
Witnesses
Louis N. Gowell
James M. Urquhart
Inventor
William P. Phillips.
by Crosby Gregory
Attys.

UNITED STATES PATENT OFFICE.

WILLIAM P. PHILLIPS, OF BOSTON, MASSACHUSETTS.

LUBRICATOR.

SPECIFICATION forming part of Letters Patent No. 629,465, dated July 25, 1899.

Application filed June 27, 1898. Serial No. 684,572. (No model.)

*To all whom it may concern:*

Be it known that I, WILLIAM P. PHILLIPS, of Boston, county of Suffolk, State of Massachusetts, have invented an Improvement in Lubricating Devices, of which the following description, in connection with the accompanying drawings, is a specification, like letters and figures on the drawings representing like parts.

This invention relates to that class of lubricating devices sometimes called "sight-feed oil-cups," wherein the lubricant passes through the discharge-outlet of an oil-chamber through a duct or passage having a sight-opening, the flow of the lubricant being controlled by a valve.

Figure 1 in side elevation represents a lubricating device embodying my invention. Fig. 2 is a top or plan view thereof; and Fig. 3 is a vertical sectional view on the line $x\ x$, Fig. 2.

The oil or lubricant chamber A, comprising a glass cylinder having metal top and bottom $a\ b$, is of usual construction, the bottom having a hollow tube $b^\times$ therein connected with the top by a threaded sleeve or bearing $a'$, said tube having its lower end enlarged at $b'$ and extended through the bottom $b$ of the chamber. A suitable nipple $c$, having a glass tube $c^\times$ therein and provided with sight-openings $c'$, is threaded onto the projecting enlargement $b'$, the nipple being attached in usual manner to the part to be lubricated. One or more openings $b^2$ near the lower end of the tube $b^\times$ communicate with the interior of the chamber A, and I have made a conical discharge-outlet $b^3$ at the lower end of the tube opposite the sight-openings $c'$. A controlling-valve $d$, also made conical to cooperate with the outlet $b^3$, has its stem $d'$ carried up through the tube $b^\times$ and enlarged and threaded at $d^2$ to engage the bearing $a'$, a suitable milled nut $d^\times$ on the stem above the chamber providing means for rotating the stem and valve to thereby move the latter to open or close the discharge-outlet $b^3$. By this construction a positive movement of the valve is effected, and the latter can be firmly seated to cut off the supply of lubricant when desired.

A small threaded pin or extension $d^3$ projects above the nut $d^\times$ and passes through a longitudinal slot $f^\times$ (see dotted lines, Figs. 1 and 2) in a dog $f$, made of a piece of sheet metal, extending beyond the periphery of the nut and notched, as at $f'$, to engage a fixed catch $f^2$, preferably a piece of spring metal, attached to the top of the chamber. A clamp-nut $g$ on the extension $d^3$ serves to clamp the dog firmly on the nut $d^\times$ and prevent relative rotative movement of the valve-stem and dog. When the valve has been adjusted to permit the proper feed of lubricant through the outlet $b^3$, the dog is moved into engagement with the catch $f^2$ and clamped upon the valve-stem by nut $g$. Now when it is desired to close the outlet entirely the catch is sprung out to disengage the dog, and the valve-stem is turned to force the valve firmly upon its seat. Thereafter when it is desired to resume feed of the lubricant the nut $d^\times$ is turned to open the outlet, and when the proper feed-opening is reached the catch $f^2$ will snap into the notch of the dog and stop further movement of the valve, the end of the dog at each side of the notch being preferably rounded, as at 3, Fig. 2, to facilitate entrance of the catch into the notch.

It will be obvious from the foregoing description that after the feed-opening has been once adjusted no further care is necessary on the part of the operator when opening the valve after closure, as the valve will always be stopped at the same predetermined point.

The construction is simple, cheap, and efficient and has no parts to get out of order or become displaced.

Having described my invention, what I claim, and desire to secure by Letters Patent, is—

1. An oil-chamber having a discharge-outlet, a threaded bearing, a controlling-valve for said discharge-outlet provided with a longitudinal stem in threaded engagement with and passing through said bearing, a nut on said stem having a threaded extension, a second nut turnable on said threaded extension, a dog having a slot to receive said threaded extension, and adapted to turn on the same as a pivot, and to be clamped in an adjusted position between said nuts by the operation of one of them, and a catch coöperative with said dog.

2. An oil-chamber having a discharge-outlet, a threaded bearing, a controlling-valve for said discharge-outlet provided with a longitudinal stem in threaded engagement with and passing through said bearing, a nut on said stem having a threaded extension, a second nut turnable on said threaded extension, a dog having a longitudinal slot to receive said extension, and also having a notched and rounded end, and a resilient catch fixed relatively to the dog and adapted to engage in said notch thereby to hold the valve in an adjusted position.

In testimony whereof I have signed my name to this specification in the presence of two subscribing witnesses.

W. P. PHILLIPS.

Witnesses:
JOHN C. EDWARDS,
EMMA J. BENNETT.